Dec. 10, 1968 J. A. VRIEND 3,415,334
HYDRAULIC DRIVE FOR MOTOR VEHICLES
Filed Nov. 14, 1966 4 Sheets-Sheet 1
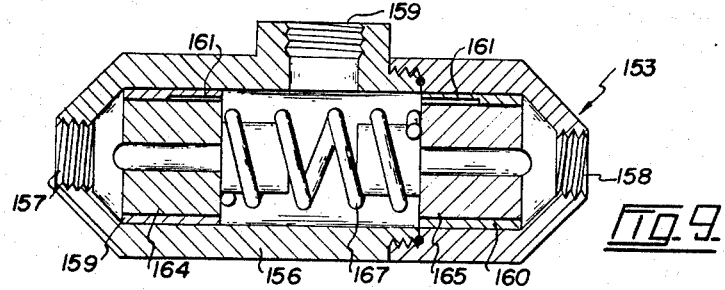
Fig. 9.
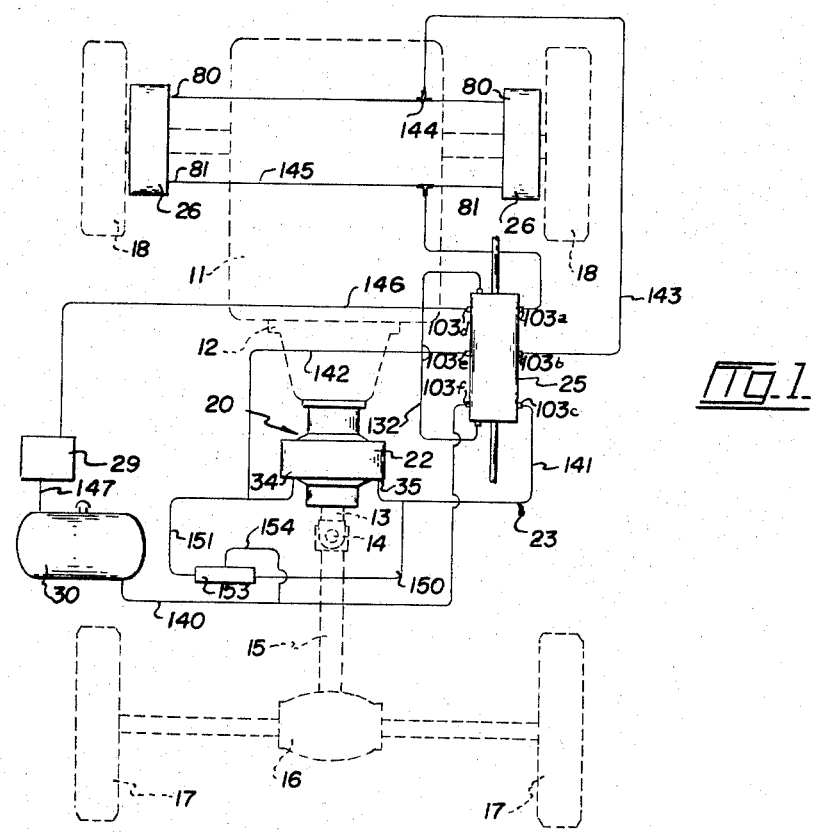
Fig. 1.
Fig. 10.
INVENTOR
JOSEPH A. VRIEND
BY
Featherstonhaugh & Co.
ATTORNEYS Dec. 10, 1968   J. A. VRIEND   3,415,334
HYDRAULIC DRIVE FOR MOTOR VEHICLES
Filed Nov. 14, 1966   4 Sheets-Sheet 2

INVENTOR
JOSEPH A. VRIEND
by
Featherstonhaugh & Co.
ATTORNEYS

Dec. 10, 1968  J. A. VRIEND  3,415,334
HYDRAULIC DRIVE FOR MOTOR VEHICLES
Filed Nov. 14, 1966  4 Sheets-Sheet 3

INVENTOR
JOSEPH A. VRIEND
BY
Fetherstonhaugh & Co
ATTORNEYS

Dec. 10, 1968  J. A. VRIEND  3,415,334
HYDRAULIC DRIVE FOR MOTOR VEHICLES
Filed Nov. 14, 1966  4 Sheets-Sheet 4
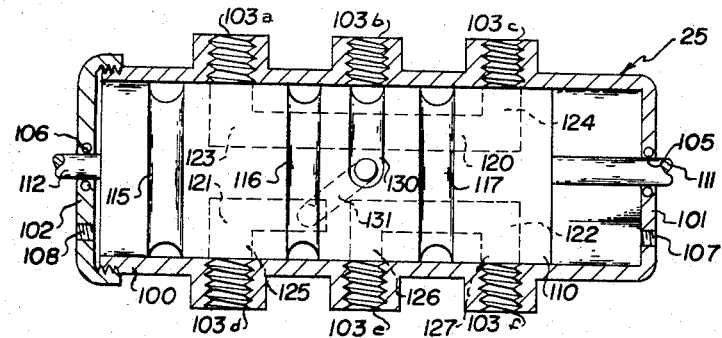
*Fig.11.*
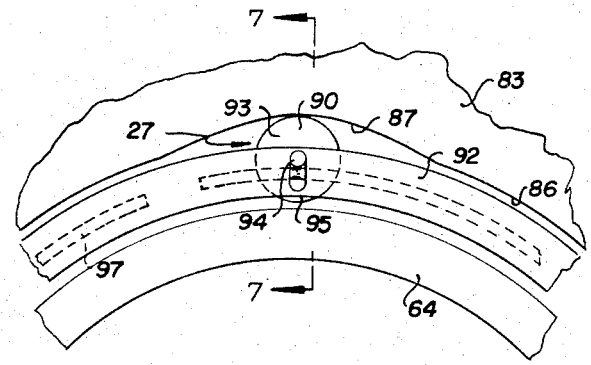
*Fig.7.*  *Fig.6.*
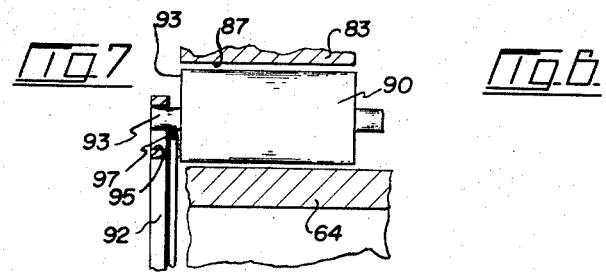
*Fig.8.*
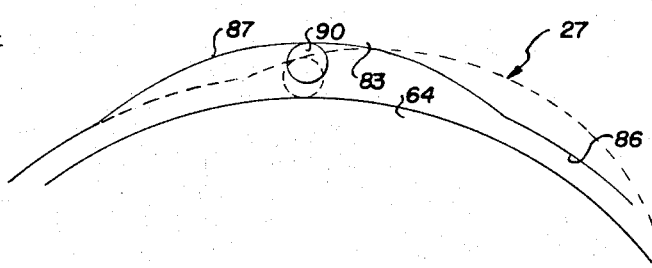
INVENTOR
JOSEPH A. VRIEND
BY
Featherstonhaugh & Co.
ATTORNEYS United States Patent Office 3,415,334
Patented Dec. 10, 1968

3,415,334
HYDRAULIC DRIVE FOR MOTOR VEHICLES
Joseph A. Vriend, Government Road,
Squamish, British Columbia, Canada
Filed Nov. 14, 1966, Ser. No. 593,786
4 Claims (Cl. 180—66)

ABSTRACT OF THE DISCLOSURE

Hydraulic drive apparatus for motor vehicles having a hydraulic pump driven by the vehicle engine and connected to a hydraulic motor at each of the wheels to be driven. The wheels are drivingly connected to the hydraulic motors through the mediacy of over-running clutches which operably connect the wheels and hydraulic motors when the latter seek to rotate faster than the wheels.

---

This invention relates to a hydraulic drive for motor vehicles and more particularly to a hydraulic drive for driving the free running wheels of motor vehicles having engine driven wheels.

In motor vehicles it is normally the practice to mechanically connect the rear wheels thereof in driven engagement with the engine of the motor vehicle, the front wheels being free wheeling. For a certain class of vehicles, principally those which are designed to travel over terrain, which by its nature will not provide sufficient traction for the operation of the motor vehicle by the driven wheels alone, mechanical means are provided whereby the front wheels may be, at the will of the operator, mechanically connected in driven engagement with the engine. However, in view of the complexity and size weight of such mechanical means, it has in the past been virtually impossible to convert a vehicle having what is commonly called two wheel drive to a vehicle in which all wheels are driven.

The apparatus, in accordance with the present invention, overcomes this problem by providing hydraulic drive means including a positive pressure hydraulic pump which, at the will of the operator, may be operably connected with the driving mechanism employed to drive the driven wheels, and positive hydraulic motors at the free wheeling wheels arranged to be automatically brought into driving engagement with the latter when the pump is in operation yet which, when the pump is not in operation, will permit free wheeling of said latter wheels.

The present invention comprises a fluid reservoir, a fluid pump, means for selectively engaging and disengaging the pump and engine, a fluid motor at at least one of the front wheels, overrunning clutch means at said front wheel for engaging said wheel and motor when the latter is operated and for disengaging said wheel and motor when the latter is inoperative, and valve controlled conduit means for connecting the reservoir pump and motor, said conduit means being operable to direct the fluid from the pump to the motor, thence to the reservoir and back to the pump.

Figure 3:
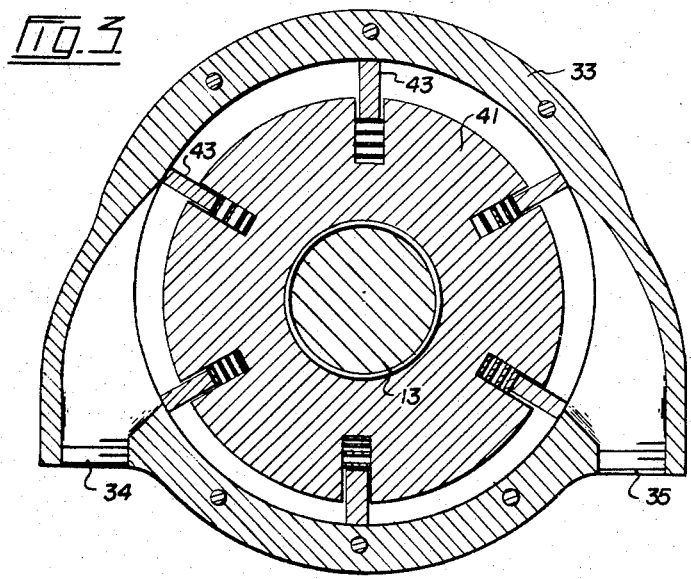
Figure 2:
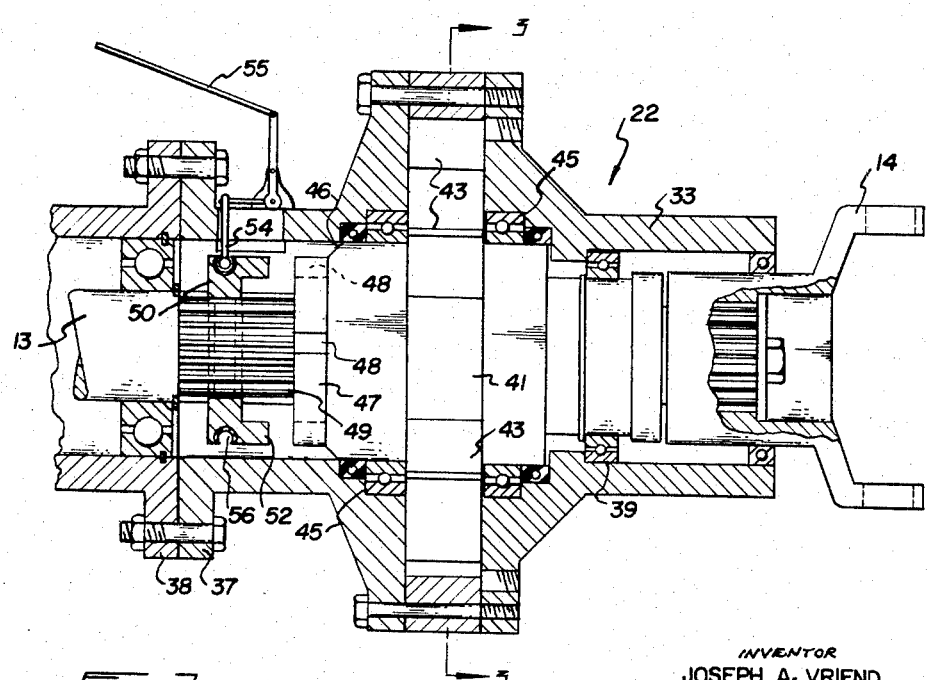
Figure 4:
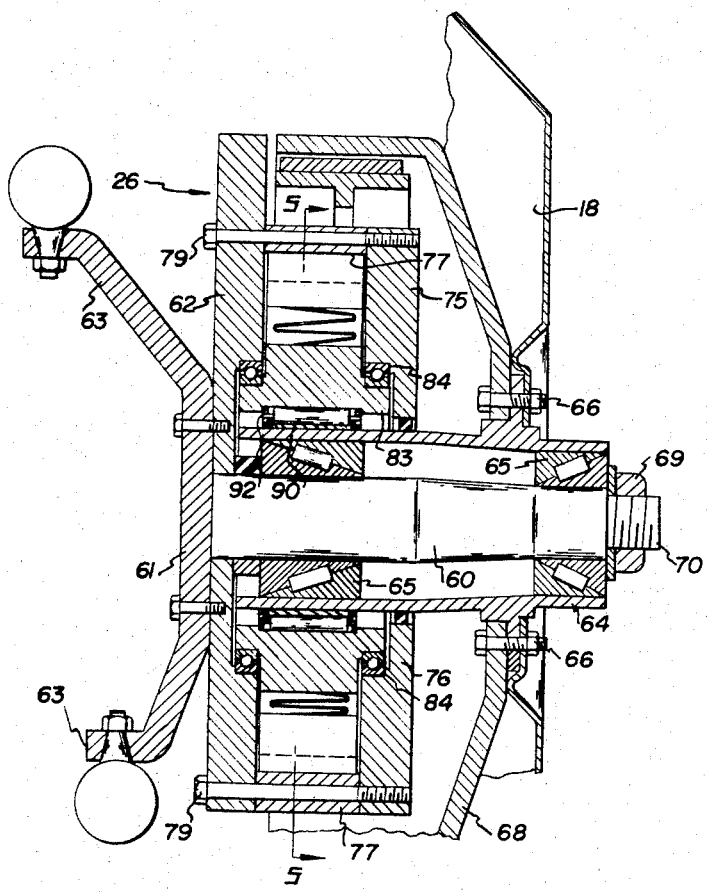
Figure 5:
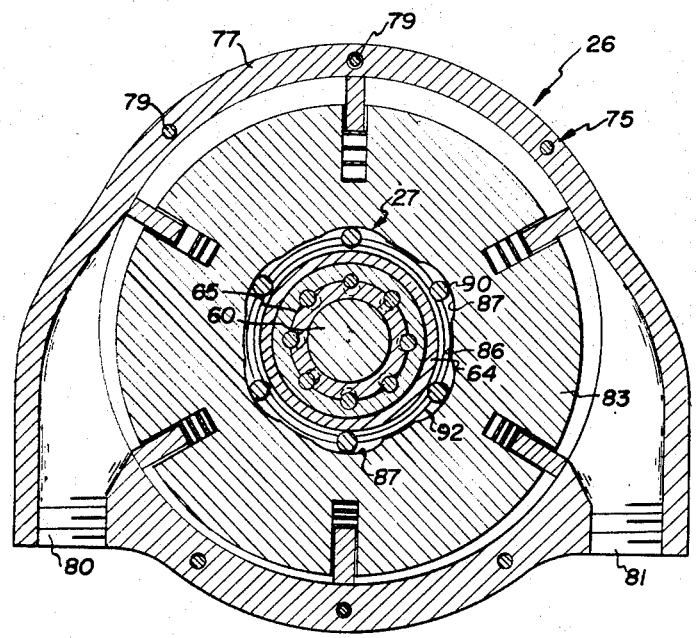

In the drawings which illustrate the invention:
FIGURE 1 is a schematic drawing of the invention showing its relationship to an automobile, the front and rear wheels, engine, transmission and drive shaft of the latter being shown in dotted lines,
FIGURE 2 is a central sectional view of the pump of the apparatus and the manner of connecting the pump to a drive shaft of a motor vehicle,
FIGURE 3 is a sectional view taken along line 3—3 of FIGURE 2,
FIGURE 4 is a central sectional side view of one of the fluid motors and overrunning clutch associated therewith, together with a portion of one of the free wheeling wheels of the motor vehicle,
FIGURE 5 is a sectional view of the apparatus as illustrated in FIGURE 4, taken along line 5—5 thereof,
FIGURE 6 is an end view of a portion of the overrunning clutch,
FIGURE 7 is a sectional view taken along line 7—7 of FIGURE 6,
FIGURE 8 is a diagrammatic view of a portion of the overrunning clutch showing, in solid lines, the relative position of its parts for free wheeling conditions and, in dotted lines, the relative position assumed by said parts for placing the free wheeling wheel in driving engagement with the motor,
FIGURE 9 is a sectional side view of the relief valve of the apparatus,
FIGURE 10 is a central sectional view of the distributor valve in one of its operating positions, and
FIGURE 11 is a central sectional view of the valve of FIGURE 10 showing the latter in the other of its operating positions.

In the hydraulic drive apparatus, the subject of this invention is intended to complement the driving mechanism of the motor vehicle normally having only two-wheel drive. In most vehicles of this type, the rear wheels thereof constitute the driving wheels, while the front wheels thereof are free wheeling and are employed for supporting and steering the vehicle. It is to be appreciated, however, that varied types of motor vehicles have been devised wherein the front rather than the rear wheels are connected in driven engagement with the engine of the vehicle. It is to be understood therefore that in the specification following, reference to the rear wheels being driven wheels and the front wheels as free wheeling wheels, is for the purpose of ease of description only.

A motor vehicle, with which the apparatus is to be associated, is diagrammatically illustrated in dotted lines in FIGURE 1, having an engine 11, and at its after end a transmission box 12 containing a transmission, not shown, driving a main shaft 13 extending from the after end of the transmission box. The main shaft is coupled through a universal joint 14 to a drive shaft 15 which, through a differential 16, drives the rear wheels 17. The front wheels 18 are mounted, for free rotation, in any suitable manner known in the automobile industry.

The hydraulic drive apparatus herein accorded the numeral 20 for identification, which is illustrated in solid lines in FIGURE 1, various components of which will be described in detail hereinafter, comprises a positive pressure reversible pump 22, preferably of the sliding-vane type, which encircles the main shaft 13 and which may be operably engaged with the latter for rotation in either direction therewith depending on the direction in which it is intended to operate the automobile.

The pump 22 is connected through a conduit system, generally accorded the numeral 23, and through a distributor valve 25 to a pair of positive pressure reversible fluid motors 26, preferably of the sliding-vane type, at each of the front wheels 18, each of said fluid motors being operably connectable to its associated front wheel through an overrunning clutch mechanism, generally accorded the numeral 27, which places the fluid motors 26 in engagement with front wheels 18 only when said fluid motors are in operation. Also connected in the conduit system, is a fluid cooler 29 and a fluid reservoir 30.

The distributor valve 25, to be described hereinafter in detail, is designed so that the fluid discharged from the pump 22, regardless of the direction of rotation of the latter, is directed to the appropriate side of the reversible fluid motors 26 which will cause the latter to rotate and with them the front wheels 18 in the same direction as the rear wheels, thence direct the fluid discharged from the fluid motors 26 through the cooler and reservoir and back to the suction side of the pump 22.

The reversible sliding-vane pump 22 is illustrated in detail in FIGURES 1 and 2 and 3, and includes a casing 33 having ports 34 and 35 which, in view of the pump being reversible, alternate as discharge and intake ports. This casing which is elongated in fore and after direction is mounted over the main shaft 13 and is bolted at one end 37 to the after end 38 of the transmission box. The casing 13 is also rotatably supported as by bearings 39 on the main shaft. The pump 22 which is of the known sliding-vane type includes an annular rotor 41 which is also mounted over the main shaft 13 and is rotatable relative to the latter, said rotor including spring-urged slidable vanes 43, and being rotatably mounted within the casing 13 on bearings 45. It is to be appreciated that sliding vane type fluid motors are well known and, it is consequently deemed unnecessary to describe them in detail.

At one end 46 of the rotor there is formed, preferably as an integral part thereof, a collar 47 which rotatably encircles the main shaft 13 and which is provided with a plurality of equidistantly-spaced peripheral grooves 48. The main shaft 13 is provided with a longitudinally splined portion 49 forwardly of the collar 47 to which is fitted a clutch collar 50, the latter being suitably splined so as to result in a longitudinally slidable yet non-rotatable connection with the main shaft, and having longitudinally and rearwardly extending lugs 52 formed thereon adapted to slidably fit with the grooves 48 of collar 47.

This clutch collar 50 is movable into and out of engagement with the collar 47 by means of a forked lever 54 pivotally secured to the transmission box and operated by an operating rod 55, said forked lever having a slidable fit with a peripheral goove 56 formed in the collar 50 so as to permit free rotation of the latter with the main shaft 13 and to ensure positive control of its position longitudinally thereon.

The operating rod 55 may be operated through an operating lever, not shown, which may be positioned so as to be easily handled by the operator of the vehicle.

One of the motors 26 is illustrated in FIGURES 4 and 5 of the drawings. FIGURE 4 also illustrates the normal construction of one of the front wheels 18 and its connection with the vehicle. The front wheel of the vehicle, as illustrated in FIGURE 4, is normally mounted on an elongated spindle 60 which is carried on a supporting structure 61, said supporting structure being illustrated in FIGURE 4 as being of the ball-suspension type. A circular backing plate 62 fits over the spindle and is bolted to the supporting structure 61 which supports the braces 63.

A tubular cylindrical sleeve 64 is mounted for rotation on the spindle on bearings 65 and, to this sleeve are connected as by bolts 66 for rotation therewith, wheels 18 and conventional brake drums 68. It will, of course, be appreciated that in some wheels, brake discs are used rather than brake drums, consequently, the word drums shall be read to include discs. The sleeve 64 is maintained on the spindle by means of a nut 69 threaded over the outer end 70 of the spindle bearing against one of the bearings 65.

The motor 26 includes a casing 75 spacedly encircling the sleeve 64. This casing is comprised of the circular plate 62, an outer circular end plate 76 and a peripheral wall 77 spacing said plates apart. Bolts 79 are extended through the circular plate 62 and peripheral wall 77, and threadedly engage with the end plate 76. Ports 80 and 81 are formed in the peripheral wall 77 which, in a manner of the pump port, alternate as discharge and intake ports depending upon the direction of flow of fluid thereinto as controlled by the distributor valve 25.

As hereinbefore indicated, the motor is of a sliding vane type and includes an annular rotor 83 supported for rotation within the casing 75 on bearings 84 for rotation about the sleeve 64. This rotor 83 has formed on its inner annular surface 86 a plurality of transversely extending equidistantly spaced apart grooves 87. These grooves, as illustrated in FIGURE 5, are wide and shallow and of arcuate shape so that the space between the sleeve and the walls of the grooves narrows gradually from either side of the centre line of each groove.

Located in each groove and having a diameter slightly less than the distance measured between the centre of the groove and the outer surface of the sleeve 64 so as to have a loose fit therebetween, is a pin-ended roller 90. These rollers are carried in equidistantly spaced apart relationship in a roller cage 92 of conventional design, and so arranged so as to provide radial movement relative thereto.

Referring to FIGURE 6, there is illustrated a preferred form of connection between the roller cage 92 and one end 93 of one of the rollers 90. As each end of the roller is of identical nature and both ends are connected to the cage 92 in the same manner as hereinafter to be described, the end of the roller opposite its end 93 is not illustrated. As is illustrated, the roller 90 has a pin 94 extending from its end 93 thereof. This pin extends through a radially extending slot 95 formed in the roller cage so as to permit radial movement of the roller 90 relative to said cage 92.

A circular expanding split spring 97 is inserted under compression between the ends 93 of the rollers 90 and the cage 92, said spring being located so as to engage the pins 94 and urge the rollers radially outwardly towards the radially outer end of the slots 95 and into engagement with the walls of their associated grooves 87. The arcuate shape of the latter will result in the rollers 90 positioning themselves centrally of said grooves. It will be seen therefore that when the rotor 83 is stationary, there will be no contact between the rollers 90 and the sleeve 64 which will result in wheels 18 assuming a freewheeling condition.

Upon the introduction of a fluid into either of the ports 80 or 81, the rotor 83 will start to rotate. However, due to the inertia of the rollers 90 and the roller cage 92, said rollers will not initially rotate at the same speed as the rotor, but will gravitate to one side or the other of grooves 87 in which they are located, depending upon the direction of rotation of the rotor 83, the arcuate shape of the grooves moving said rollers 90 radially inwardly against the spring 97 until each roller is jammed between the wall of the groove in which it is located and the sleeve 64, thereby locking the rotor 83 in driving engagement with the sleeve 64. This engagement will not be broken provided the rotor 83 is continually urged to try to rotate faster than the sleeve 64. When rotation of the rotor 83 is again halted, the rotating sleeve 64 will, it will be seen, move the rollers out of their jamming or locking position and permit the latter to again gravitate, under the action of the spring 97, to a position centrally of the grooves 87, thereby again placing the wheel 18 in a freewheeling condition.

FIGURE 8 illustrates diagrammatically the action of the clutch mechanism 27. In this figure, there is illustrated in solid lines, the related positions of the rotor 83, sleeve 64 and one of the rollers 90 when the wheel 18 is in a freewheeling condition and, in dotted lines, their related positions when the sleeve 64 is placed in driving engagement with the rotor 83. It will be evident that the locking action of the rollers 90 as described will occur for both forward and reverse drive of the rotor 83, providing the rotor is driven in a manner that it seeks to rotate faster than the sleeve 64.

The distributor valve as illustrated in FIGURES 10 and 11, comprises an elongated tubular cylindrical casing 100 closed at one end 101 and having a cap 102 threaded over its other end. The walls of the casing 100 have formed therein six threaded ports, numbered 103a, b, c, d, e, f, ports 103a, b and c being spaced apart equidistantly and lying in alignment with each other and in paired diametrically opposite relationship with ports 103*d*, *e* and *f*. The end 101 and cap 102 are provided with central apertures 105 and 106, respectively, and with threaded ports 107 and 108, respectively.

Slidably mounted within the casing 100 for reciprocal movement therein, is a cylindrical valve body 110 having cylindrical shafts 111 and 112 at either end thereof which slidably extend through the apertures 105 and 106 respectively. This valve body is provided with three circumferential grooves 115, 116 and 117, these grooves being equidistantly spaced apart and matching the spacing of ports 103*a*, *b* and *c*. Also formed in the valve body 110, are longitudinally extending internal passages 120, 121 and 122. Passage 120 is ported at the surface of the valve body at 123 and 124, passage 121 ported at 125, and passage 122 ported at 126 and 127. Also formed in the valve body, is a circumferential groove 130 spaced between grooves 116 and 117, and connected to passage 121 via bore 131.

The configuration of the valve body 110 relative to the casing 100 is such that when said valve body is positioned, as illustrated in FIGURE 10, ports 103*a* and *d*, 103*b* and *e*, and 103*c* and *f* are placed in communication via the grooves 115, 116 and 117, respectively, and when the valve body is placed in position as illustrated in FIGURE 11, ports 103*a* and *c* are placed in communication via passage 120, ports 103*b* and *e* via bore 131 and passage 121, and ports 103*e* and *f* placed in communication via passage 122. The ports 107 and 108 are also interconnected via a relief conduit 132, as illustrated in FIGURE 1, to provide for fluid or air which may be trapped between the ends of the valve body and the casing during movement of the former relative to the latter.

Operation of the hydraulic drive apparatus may be best described with reference to FIGURE 1, which illustrates the conduit system 23 and the operational components of the apparatus in diagrammatic form. In this figure, the distributor valve 25 has been arranged in position as shown in FIGURE 10, and it is to be assumed that the pump 22 is engaged with the main shaft 13, the latter revolving in a forward drive direction.

Fluid from reservoir 30 is conveyed through conduit 140 to port 103*f* of the valve 25, thence through groove 117, out of port 103*c*, and to the intake port 35 of the pump 22 via conduit 141. From the discharge port 34 of the pump, the fluid is conveyed via conduit 142 to port 103*e* of the valve 25, thence through groove 116 out of port 103*b* and through conduit 143 through a T-connection at 144 to the ports 80 of the motors 26 so as to drive the latter in a direction corresponding to the direction of drive of the rear wheels. From the ports 81 of the motors 26, the fluid discharge is conveyed via conduit 145 to port 103*a* of the distributor valve, thence through grooves 115 and port 103*d* via a conduit 146 to the cooler 29, thence via conduit 147 back to the reservoir 30.

Upon reversal of the direction of rotation of the pump 22 which is effected by reversal of rotation of the main shaft 13 and, consequently, reversal of rotation of the rear wheels 17, the distributor valve must be positioned as shown in FIGURE 11. In this position, ports 103*a* and *c* of the valve are placed in communication via passage 120 so as to permit discharge of the fluid from port 35 of the pump and through conduits 141 and 145 to the motors 26. As ports 103*b* and *d* of the distributor valve are now in communication, the discharge of fluid from the motors 26 will now be permitted to flow through conduits 143 and 146 back to the cooler 29 and reservoir 30.

The direction of rotation of the pump 22 is of course, dependent upon the direction of rotation of the main shaft 13 as effected by shifting the transmission with which motor vehicles are normally equipped. Consequently, the valve body 110 must be moved between its position as illustrated in FIGURE 10 and its position as illustrated in FIGURE 11 when the transmission of the motor vehicle is shifted to reverse the vehicle's direction of movement.

The shaft 11 may therefore be connected to a lever or the like, not shown, by means of which the operator of the vehicle may manually operate the valve body. It is preferred, however, to link its operation with the operation of the transmission. Any suitable linkage may be employed for this purpose.

As hereinbefore mentioned, the motors 26 must be driven so that they seek to rotate the front wheels faster than the rear wheels of the automobile. Pump 22 therefore is designed so that it delivers an amount of hydraulic fluid in excess of the amount required to drive the front wheels at the same speed as the rear wheels. As both the pump 22 and the motors 26 are of a positive type, provision is made to by-pass the extra amount of fluid from one side of the pump to the other. There are therefore connected to conduits 141 and 152, conduits 150 and 151, respectively, which are connected through a spring-closed relief valve 153 and conduit 154 to the conduit 140 leading from the reservoir 30.

The relief valve 153 is illustrated in FIGURE 8, and has an elongated closed cylindrical casing 156 having a threaded port 157 in one end to which conduit 151 is connected, and a similar threaded port 158 in its other end to which conduit 150 is connected. There is also provided a threaded port 159 formed in the casing intermediate its ends into which conduit 154 is connected. At either end of the casing 156 are fitted cylindrical sleeves 159 and 160. These sleeves are identical, each of them having a longitudinally-extending inwardly opening slot 161 formed therein.

These sleeves 159 and 160 are each arranged to slidably receive pistons 164 and 165 respectively, the latter being urged apart by a helical compression spring 167 inserted, under compression, therebetween so that the pistons 164 and 165 are both urged apart so as to cover the slots 161, thereby closing the valve 153 to the passage of fluid therethrough. However, when the fluid pressure in either of conduits 150 and 151 exceeds the pressure exerted by the spring 167, the piston subjected to such pressure will move inwardly exposing the slot 161 in its associated sleeve to permit passage of the fluid into conduit 154.

It will be seen that the apparatus as described provides a positive hydraulic drive for the front wheels of the motor vehicle, the torque being governed by the compressive strength of spring 167. Furthermore, no power loss is incurred when the pump is non-operational as the front wheels automatically assume a free wheeling condition.

It will also be seen that to install the apparatus very few alterations are required for its installation in a standard two wheel drive vehicle.

What I claim as my invention is:

1. Hydraulic drive apparatus for a motor vehicle having front wheels and engine driven rear wheels comprising a fluid reservoir, a reversible fluid motor at at least one of the front wheels, a reversible fluid pump, an overrunning clutch at said one front wheel for automatically and releasably connecting the motor in driving engagement with said one wheel when said motor is operated at a speed in excess of the speed required to rotate said front wheel at the same speed as the rear wheels, said clutch being adapted to disengage the motor and said front wheel when said motor is operated at a speed slower than that required to drive the front wheels at the same speed as the rear wheels, means for selectively connecting or disconnecting the engine and pump for operation of the latter, said pump being adapted to discharge fluid in excess of the fluid required to be delivered to the motor for operating the latter at a speed in excess of the speed required to rotate said front wheels at the same speed as the rear wheels, valve controlled conduit means connecting the reservoir, pump and motor for selectively directing the flow of fluid from either side of the pump to either side of the motor, thence to the reservoir and back to the pump, and normally closed spring-urged relief valve means in said conduit means operable at a predetermined fluid pressure at either side of the pump to yieldably open and permit the escape of fluid from the discharge side of the pump.

2. Hydraulic drive apparatus as claimed in claim 1 in which the overrunning clutch comprises a rotatable tubular member having an inner cylindrical wall, said wall having a plurality of equidistantly spaced apart longitudinally extending grooves formed therein, said grooves being formed so that the walls of each of them slope gradually from the centre line of each groove to the juncture of said groove walls with said inner cylindrical wall, a cylindrical member non-rotatably connected to the wheels extending into the tubular member in spaced coaxial relationship therewith, a frictional jamming element located in each groove and having a loose fit therein so as to be radially and angularly movable relative thereto and being adapted when moved angularly with respect to the tubular member to slidably engage the walls of the groove and move radially inwardly into frictional engagement with the cylindrical member, and radially acting yieldable resilient means associated with the jamming elements normally urging the latter radially outwardly away from said cylindrical member.

3. Hydraulic drive apparatus as claimed in claim 1 in which both the pump and motor are of the positive pressure type.

4. Hydraulic drive apparatus as claimed in claim 2 in which each of the jamming elements is a cylindrical roller, the diameter of each being less than the distance between the wall of the groove in which it is located and the surface of the cylindrical element measured from the centre line of the groove.

References Cited

UNITED STATES PATENTS

| | | | |
|---|---|---|---|
| 2,913,061 | 11/1959 | Beyerstedt et al. | 180—51 X |
| 3,053,043 | 9/1962 | Knowler | 180—66 X |
| 3,217,826 | 11/1965 | Carter et al. | 180—66 X |
| 3,272,276 | 9/1966 | Budzich | 180—66 X |
| 3,272,279 | 9/1966 | Budzich | 180—66 X |

BENJAMIN HERSH, *Primary Examiner.*

MILTON L. SMITH, *Assistant Examiner.*